US009320047B2

(12) United States Patent
Li et al.

(10) Patent No.: US 9,320,047 B2
(45) Date of Patent: Apr. 19, 2016

(54) NETWORK ASSISTED SENSING ON A SHARED BAND FOR LOCAL COMMUNICATIONS

(75) Inventors: Zhenhong Li, Shanghai (CN); Haiming Wang, Beijing (CN); Chunyan Gao, Beijing (CN); Haifeng Wang, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 207 days.

(21) Appl. No.: 13/883,950

(22) PCT Filed: Nov. 25, 2010

(86) PCT No.: PCT/CN2010/079120
§ 371 (c)(1),
(2), (4) Date: May 7, 2013

(87) PCT Pub. No.: WO2012/068731
PCT Pub. Date: May 31, 2012

(65) Prior Publication Data
US 2013/0223398 A1   Aug. 29, 2013

(51) Int. Cl.
*H04W 72/08* (2009.01)
*H04W 72/04* (2009.01)
*H04W 76/02* (2009.01)

(52) U.S. Cl.
CPC .......... *H04W 72/085* (2013.01); *H04W 72/042* (2013.01); *H04W 76/023* (2013.01)

(58) Field of Classification Search
CPC ............. H04W 72/04; H04W 72/0406; H04W 72/048; H04W 72/08; H04W 72/082; H04W 72/085; H04W 72/087
See application file for complete search history.

(56) References Cited

U.S. PATENT DOCUMENTS 8,509,701 B2 * 8/2013 Selen ................... H04W 24/08
455/509
8,831,520 B2 * 9/2014 Demessie ............. H04W 16/14
370/328

(Continued)

FOREIGN PATENT DOCUMENTS

| CN | 101155423 A | 4/2008 |
| CN | 101753174 A | 6/2010 |
| CN | 101895895 A | 11/2010 |

OTHER PUBLICATIONS

International Search Report and Written Opinion received for corresponding Patent Cooperation Treaty Application No. PCT/CN2010/079120, dated Sep. 8, 2011, 12 pages.

*Primary Examiner* — Chi H Pham
*Assistant Examiner* — Weibin Huang
(74) *Attorney, Agent, or Firm* — Squire Patton Boggs (US) LLP

(57) ABSTRACT

To find a D2D channel, by example a shared channel for offload traffic from an allocated D2D channel, a cellular network access node sends a configuration message with parameters (e.g., sensing time, frequency band, sensing mechanism, cyclic shift) for a D2D device to sense spectrum. From results of this spectrum sensing is decided whether to utilize a frequency band, sensed according to the parameters, for D2D communications. In an embodiment the network selects a subframe configuration to set the sensing time, in which different subframe configurations have different-length guard periods which is the sensing time. In embodiments a first sensing is within a guard period and represents coarse sensing results and if those are not sufficient the network configures a longer sensing time (e.g., spanning multiple subframes) for finer sensing results. The network or alternatively the D2D device decides whether to use the sensed frequency band for offload traffic.

16 Claims, 5 Drawing Sheets

(56) References Cited

U.S. PATENT DOCUMENTS

2008/0165880 A1* 7/2008 Hyon ............... H04B 7/026 375/267
2010/0069013 A1* 3/2010 Chaudhri ............ H04W 16/14 455/67.11
2010/0248769 A1* 9/2010 Li ................... H04L 5/0062 455/509
2012/0294168 A1* 11/2012 Freda ............... H04B 1/0067 370/252

* cited by examiner

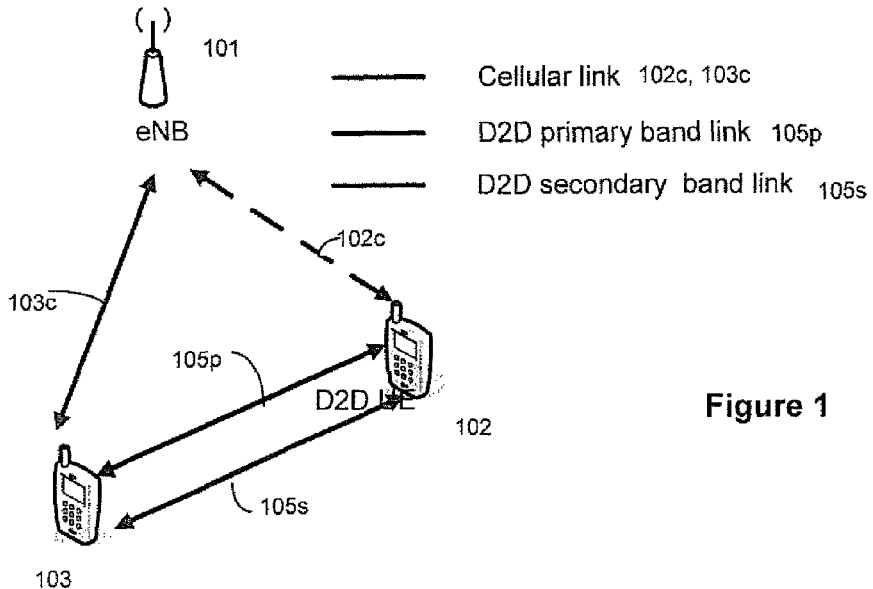
Figure 1
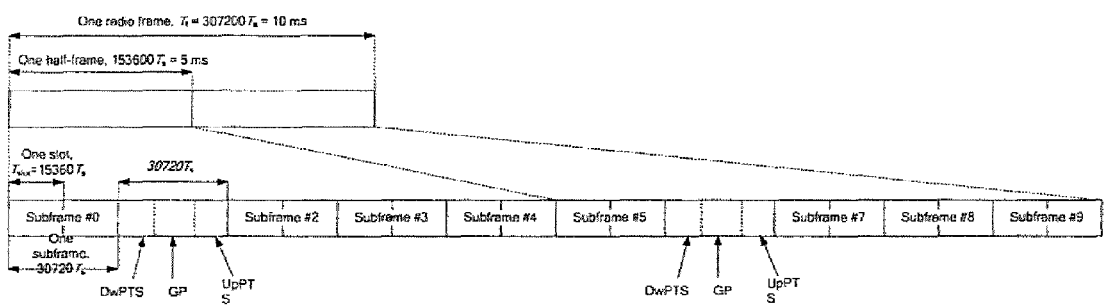
Figure 2
| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
Figure 3

| Configuration | Normal CP | | | Extended CP | | |
|---|---|---|---|---|---|---|
| | DwPTS | GP | UpPTS | DwPTS | GP | UpPTS |
| 0 | 3 | 10 | 1 | 3 | 8 | 1 |
| 1 | 9 | 4 | 1 | 8 | 3 | 1 |
| 2 | 10 | 3 | 1 | 9 | 2 | 1 |
| 3 | 11 | 2 | 1 | 10 | 1 | 1 |
| 4 | 12 | 1 | 1 | 3 | 7 | 2 |
| 5 | 3 | 9 | 2 | 8 | 2 | 2 |
| 6 | 9 | 3 | 2 | 9 | 1 | 2 |
| 7 | 10 | 2 | 2 | | | |
| 8 | 11 | 1 | 2 | | | |
Figure 4
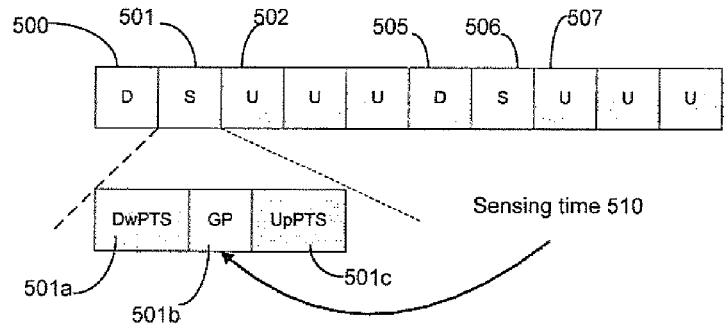
Figure 5
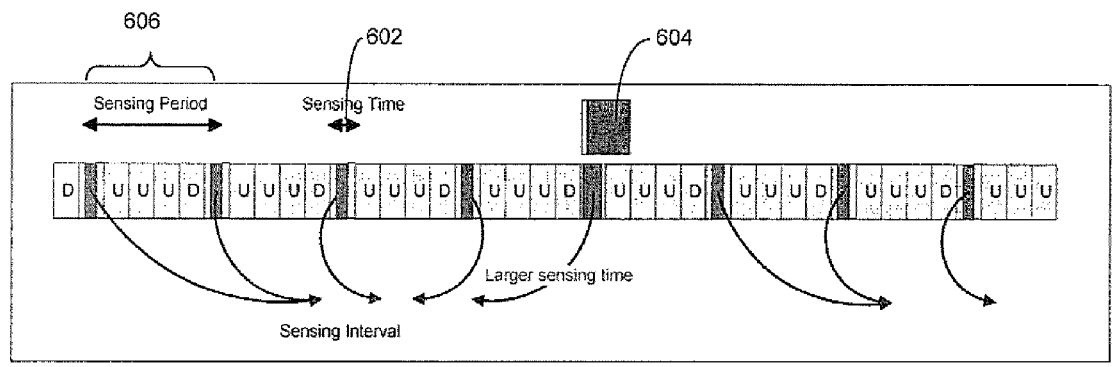
Figure 6

902: utilizing parameters in a configuration message communicated downlink between a network access node and a UE for setting at least a sensing time during which the UE performs spectrum sensing

904: deciding from at least a result of the spectrum sensing whether to utilize a frequency band sensed according to the parameters for direct local communications between the UE and at least one paired device

Figure 9

NETWORK ASSISTED SENSING ON A SHARED BAND FOR LOCAL COMMUNICATIONS

RELATED APPLICATION

This application was originally filed as Patent Cooperation Treaty Application No. PCT/CN2010/079120 filed Nov. 25, 2010.

TECHNICAL FIELD

The exemplary and non-limiting embodiments of this invention relate generally to wireless communication systems, methods, devices and computer programs and, more specifically, relate to communications in heterogeneous networks.

BACKGROUND

The following abbreviations that may be found in the specification and/or the drawing figures are defined as follows:
  3GPP third generation partnership project
  CP cyclic prefix
  D2D device to device (sometimes termed machine to machine M2M or peer-to-peer P2P)
  DwPTS downlink pilot timeslot
  DL downlink (eNB towards UE)
  eNB EUTRAN Node B (evolved Node B)
  GP guard period
  LTE/LTE-A long term evolution/long term evolution-advanced
  PDCCH physical downlink control channel
  PUCCH physical uplink control channel
  RAT radio access technology
  RRC radio resource control
  TDD time division duplex
  UE user equipment
  UL uplink (UE towards eNB)
  UpPTS uplink pilot timeslot Research is ongoing into integrating new network topologies into cellular networks. For example, current discussions in LTE/LTE-A of 3GPP concern deploying a heterogeneous network of macros, micros, picos, femtos and relays in the same spectrum. One manner of doing this is two or more mobile devices and machines forming a local communication network under supervision of a cellular network. Such a supervised local network is one implementation of a D2D network, which might include the locally-linked devices performing certain tasks (e.g., spectrum sensing) in co-operative way. Generally the D2D devices need not have the same capabilities; for example an advanced device may act as a gateway for one or more low-capability devices or machines to access a broader network (e.g., cellular or Internet). A common theme in D2D is that the local D2D links represent a secondary usage of the cellular network's radio resources.

FIG. 1 illustrates an exemplary and non-limiting example of such a heterogeneous network. There is a cellular base station/eNB 101 and two or more UEs 102, 103 forming a D2D network amongst themselves. The D2D devices 102, 103 may each operate in the cellular communication mode with the base station 101 as well as in a local D2D mode with one another. In the cellular mode, links 102c and 103c carry data as well as control signaling. For purposes herein the cellular links 102c, 103c carry control information and so the D2D devices 102, 103 need not have an active data link with the cellular network. In the environment of FIG. 1, the UEs 102, 103 are in direct communication with one another over a primary D2D link 105p, which the cellular network 101 has allocated via the cellular links 102c, 103c for their D2D communications. By example, to save signaling overhead each such allocation may be sent in a single message (e.g., a PDCCH addressed to a temporary identifier (e.g., a cell radio network temporary identity C-RNTI) assigned by the cellular network 101 to the D2D cluster, which each device 102, 103 of the cluster monitors.

One problem which may arise is that the D2D primary link 105d, which is allocated by the cellular network 101 for D2D communications, is insufficient for all the D2D data needs. By example this may result from high cellular demand for which the cellular network 101 may be obligated to give scheduling priority over D2D traffic, or simply from a high volume of D2D traffic. Some prior art approaches term the excess D2D traffic offload traffic.

Increasingly, mobile terminals such as those operating in the positions of the UEs 102, 103 of FIG. 1 are multi-radio devices with capability to operate on multiple different RATs (e.g., LTE, high-speed data packet access HSDPA, global system for mobile communication GSM, wireless local area networks WLAN also termed WiFi). It may be efficient where able to exploit these other RAT capabilities when able to handle the offload traffic.

One approach is to utilize cellular-network servers to assist offloading to WiFi, see FAST TRACK TO OFFLOAD CELLULAR DATA TO WIFI NETWORKS (http://www.notava.com/notava/uploads/Brochures/uAxesBrochure_v06.pdf, last visited Nov. 17, 2010). This may not always be the most flexible way of handling the local communication, for if devices are already in direct communication on a cellular-allocated primary D2D band 105p and want to W establish a new service between them which requires more resources, they can generally do the offloading procedure independently or with little assistance from the network.

Another offloading approach, detailed at co-owned U.S. patent application Ser. No. 12/782,877 filed on May 19, 2010, is for a network entity termed a D2D registration server function (DRSF) to assist with required RRC functionality for setting up and maintaining D2D communications between devices in 3GPP networks over both licensed bands and unlicensed bands. In that co-owned patent application the DRSF requests the D2D devices to make inter-RAT measurements on the unlicensed band for cellular band traffic offloading to the unlicensed band as decided by the network.

Such an unlicensed band for the offload traffic is shown at FIG. 1 as a secondary D2D link 105s. By example and unlike the primary D2D link 105p, the secondary D2D link 105s is not a cellular resource which is allocated by the network 101 directly but instead is compiled from 'holes' in the cellular licensed band which are found by spectrum sensing and opportunistically exploited for D2D use. The spectrum sensing assures that the D2D communications do not interfere with the primary users, those operating within the cellular system on radio resources specifically allocated by the network 101 which controls those resources.

Various specifics as to what is sensed are known in the art; a signal level exceeding a threshold, energy detection, (cyclostationary) feature detection, correlation, etc. How to arrange this sensing is more constrained, given the limited power reserves and processing capacity of the D2D devices 102, 103 and the desire to avoid high signaling overhead in sharing any sensing results among the D2D devices which utilize them. The exemplary embodiments detailed herein detail an efficient arrangement for organizing spectrum sensing, which may be used to find the D2D secondary link 105s of FIG. 1 onto which offload traffic might be ported. Such embodiments may also be practiced where there is no network-allocated primary D2D link 105p, in which the relevant traffic would not be characterized as offload.

SUMMARY

The foregoing and other problems are overcome, and other advantages are realized, by the use of the exemplary embodiments of this invention.

In a first aspect thereof the exemplary embodiments of this invention provide a method, comprising: utilizing parameters in a configuration message communicated downlink between a network access node and a user equipment for setting at least a sensing time during which the user equipment performs spectrum sensing; and deciding from at least a result of the spectrum sensing whether to utilize a frequency band sensed according to the parameters for direct local communications between the user equipment and at least one paired device.

In a second aspect thereof the exemplary embodiments of this invention provide a tangible computer readable memory storing computer program code that is executable by at least one processor, the computer program code comprising: code for utilizing parameters in a configuration message communicated downlink between a network access node and a user equipment for setting at least a sensing time during which the user equipment performs spectrum sensing; and code for deciding from at least a result of the spectrum sensing whether to utilize a frequency band sensed according to the parameters for direct local communications between the user equipment and at least one paired device.

In a third aspect thereof the exemplary embodiments of this invention provide an apparatus, comprising at least one processor and at least one memory storing computer program code. The at least one memory and the computer program code are configured, with the at least one processor, to cause the apparatus to at least: utilize parameters in a configuration message communicated downlink between a network access node and a user equipment for setting at least a sensing time during which the user equipment performs spectrum sensing; and decide from at least a result of the spectrum sensing whether to utilize a frequency band sensed according to the parameters for direct local communications between the user equipment and at least one paired device.

BRIEF DESCRIPTION OF THE DRAWINGS

FIG. 1 is a high level schematic diagram illustrating co-existence of a D2D network with primary and secondary D2D links integrated into a cellular network.

FIG. 2 is a prior art frame structure type 2 with 5 ms switch-point periodicity, reproduced from FIG. 4.2-1 of 3GPP TS 36.211 v9.1.0 (2010-03) which is utilized in an exemplary embodiment detailed with particularity herein.

FIG. 3 is a prior art table of UL and DL configurations for the frame structure of FIG. 2, reproduced from Table 4.2-2 of 3GPP TS 36.211 v9.1.0 (2010-03) which is relevant for an exemplary embodiment detailed with particularity herein.

FIG. 4 is a table showing various sub-frame configurations for the frame structure of FIG. 2 according to an exemplary embodiment of the invention.

FIG. 5 illustrates a sensing time within a frame according to the UL-DL configuration #0 of FIG. 3, according to an exemplary embodiment of the invention.

FIG. 6 is series of frames each similar to FIG. 5 but showing sensing periods as well as coarse (shorter) and fine (longer) sensing times dispersed across the multiple frames, according to an exemplary embodiment of the invention.

FIG. 9 is a logic flow diagram that illustrates, in accordance with an exemplary embodiment of this invention, the operation of a method, and a result of execution of computer program instructions embodied on a computer readable memory showing procedures for arranging spectrum sensing.

DETAILED DESCRIPTION

Figure 7:
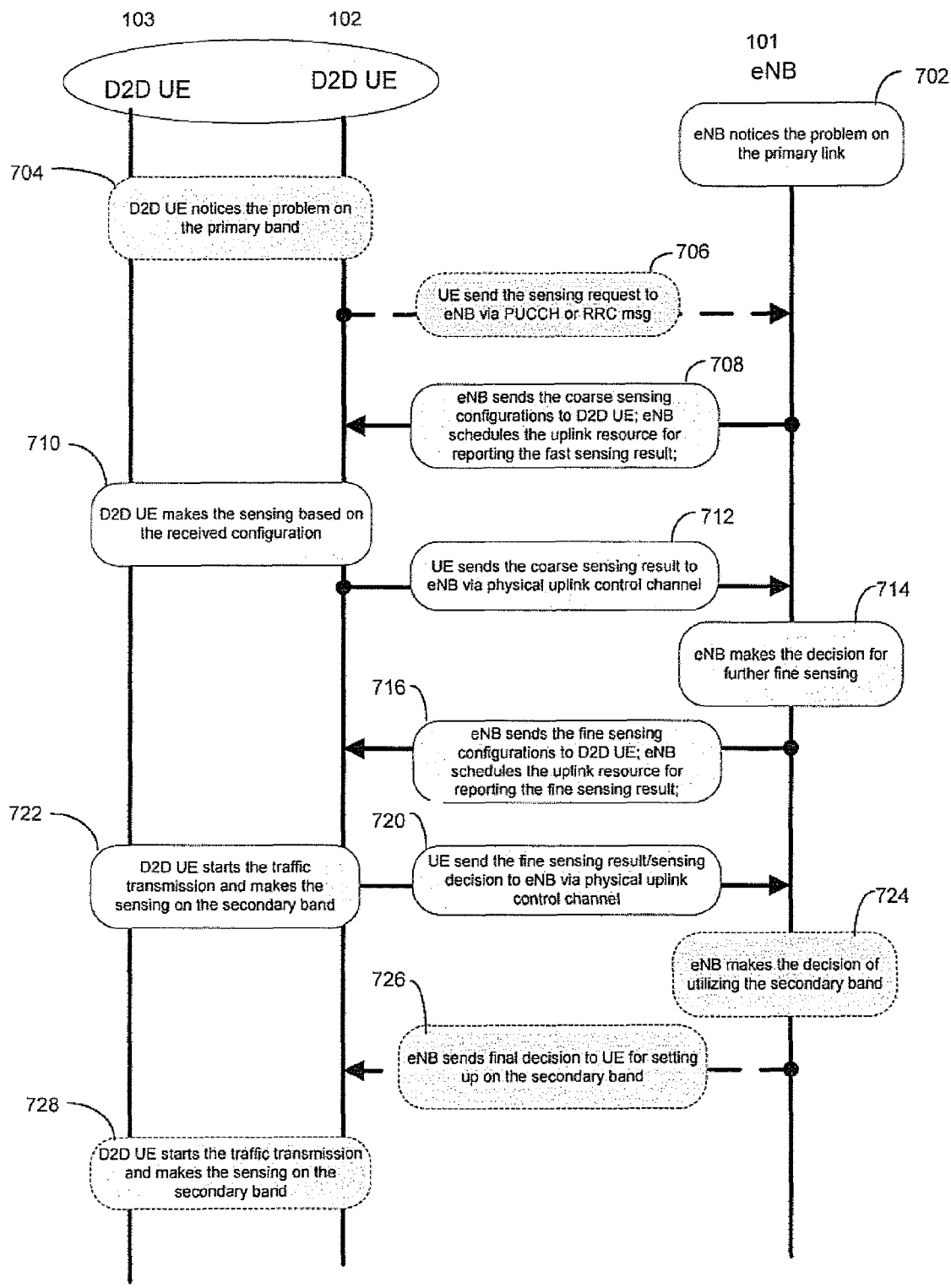
FIG. 7 is a signaling diagram showing messages exchanged to enable the coarse and fine sensing times of FIG. 6, according to an exemplary embodiment of the invention.

The spectrum sensing scheme should be arranged so as to avoid interfering with the primary users and/or to meet the requirements for particular applications while maintaining good performance for the D2D devices. In this respect the spectrum sensing may be described by parameters such as sensing time (the period over which the sensing device takes its measurement of the spectrum in question), and sensing period (the interval between different sensing events or measurements taken for spectrum sensing/D2D link discovery purposes). Other parameters may be used in certain embodiments such as the sensing mechanism (what exactly the device is to measure during the sensing time) and sensing results (binary good/bad indication, more detailed measurement reports, etc.).

In the below non-limiting examples the environment is the LTE system, though embodiments of the invention may be practiced in other RATs using a TDD division of radio resources. If one considers the primary D2D link 105p of FIG. 1 to be licensed spectrum since it is specifically allocated by the cellular network, then the secondary D2D link 105s may be considered true unlicensed spectrum since it is found as a result of spectrum sensing and opportunistically exploited on the basis of not interfering with the primary users. By example, the secondary D2D link 105s may be considered a shared band, and may lie within the ISM band (industrial, scientific, medical band, variously defined, for example 2.4 to 2.4835 GHz) or the television TV band.

In the exemplary LTE environment the type 2 TDD frame structure is reproduced at FIG. 2. There are a total of ten subframes indexed as 0 through 9 in one radio frame, with specific time spans for the frame, half-frame, subframe, and slot (half-subframe) specifically denoted there. The frame 200 can have any of the UL-DL configurations shown at FIG. 3, in which D represents a DL subframe, UL represents an UL subframe, and S represents a switching subframe in which data is not allowed to be sent UL or DL. There is an S subframe dividing every transition from DL subframe to UL subframe; this allows time for the UE to re-tune any hardware shared among its transmitter and receiver so it can transmit on time in the next subframe. FIG. 2 illustrates specifically the UL-DL configuration #0 of FIG. 3, though since UL and DL subframes are not designated at FIG. 2 it may represent any except configurations 3-5. At FIG. 2 subframes indexed as #s 1 and 6 are switching subframes, and are detailed there as each being divided into three portions.

The total length of each switching subframe, like the total length of each DL and each UL subframe is 1 millisecond (ms) in LTE since all subframes are of equal length and the whole radio frame is 10 ms. While the total length of each switching subframe is always 1 ms, the length of the individual three portions can vary in accord with 'special' frame configurations, constrained by the 1 ms total. Each switching subframe carries a leading DL pilot DwPTS, a trailing UL pilot UpPTS, and an intervening guard period GP during which no transmissions take place. It is within this GP in which exemplary embodiments of the invention have the individual D2D device 102, 103 sense spectrum for purposes of finding the D2D link 105s noted at FIG. 1. The spectrum sensing by that D2D device 102, 103 is network-assisted for these exemplary embodiments in one respect because the network 101 configures the length of the GP to facilitate this spectrum sensing as depicted at FIG. 4.

In the LTE-specific embodiment in which FIG. 3 represents the full scope of possible configurations, it is convenient to always designate the GP in subframe #1 for spectrum sensing, since that is always a switching subframe and so is available always regardless of the TDD UL-DL configuration currently in use. The other switching subframe #6 can also be utilized for spectrum sensing purposes when configurations 0 though 2 and 6 are in use. FIG. 3 denotes these as having 5 ms switching point periodicity, meaning there are two S subframes per 10 ms radio frame. Configurations 3 though 5 have a 10 ms switching point periodicity, one S subframe per 10 ms radio frame. Of course, other RATs and possibly even future changes to LTE will yield different subframes for the spectrum sensing event which occurs in the switching frame GP.

FIG. 4 is a table illustrating the extent to which the network 101 can configure the GP length for the different UL-DL configurations of FIG. 3; normal CP and extended CP refer to which cyclic prefix type is in use for the radio frame. The values at FIG. 4 refer to number of symbols for the stated portion (DwPTS, GP, UpPTS) of the switching subframe. In the normal CP for LTE there are in each 0.5 ms slot (half subframe) a total of seven symbols, with CP lengths 5.208 microseconds in the first symbol position and 4.678 microseconds in each of the remaining six symbol positions. In the extended CP for LTE there are in each 0.5 ms slot (half subframe) a total of six symbols, with CP length 16.67 microseconds in each. Adding in the remaining 66.7 microseconds per symbol position for the DwPTS, GP or UpPTS yields the 0.5 ms total slot length. So FIG. 4 accounts for a total of fourteen symbol positions per subframe in each normal CP, and for a total of twelve symbol positions per subframe in each extended CP. Other systems apart from LTE may organize the subframes differently while still having different-length GPs for different subframe configurations; FIG. 4 is presented as a specific but non-limiting example.

FIG. 5 illustrates the frame configuration #0 of FIG. 3 adapted according to an exemplary embodiment. In the radio frame there is a first switching subframe 502 disposed between DL subframe 500 and UL subframe 502, and a second switching subframe 506 disposed between DL subframe 505 and UL subframe 507. Each switching subframe 502, 506 comprises a DwPTS period 501a, a GP 501b, and a DwPTS period 501c, the lengths of which are configured by the eNB 101. The D2D device 102, 103 performs spectrum sensing during its sensing time 510 which is the GP 501b of at least the first switching subframe 501. In an embodiment there is also a spectrum sensing time in the GP of the second subframe 506 of the same radio frame.

FIG. 6 illustrates a series of four consecutive radio frames in which the eNB 101 adjusts the span of the GPs, which are shown by darker shading, in order to get a coarser or finer measurement of the spectrum. For the case in which the sensing time 602 is within a short GP the D2D device sensing the spectrum has a shorter time to measure and so the sensing results are more coarse. Coarse sensing typically could be done by energy detection in less than 1 ms. Longer GPs allow the D2D device doing the spectrum sensing to take more statistically representative measurements and so the results are more fine. The eNB 101 can also configure a larger sensing time for fine sensing by configuring a longer GP 604, or alternatively by utilizing consecutive symbol(s) within a multi-subframe sensing period 606. The network 101 may configure this sensing period 606 without regard to any GP; that is, the sensing period may span subframes 3-5 of configuration #0 of FIG. 3 (within which there are no GPs) for the fine sensing event. In still another embodiment the UE can instead or additionally perform the fine sensing in the available frequency band by measuring a test frame as detailed further below.

In this manner, exemplary embodiments of the invention exploit the GP in the LTE-TDD frame structure for sensing the shared band 105s for local area communication. In one example, where needed consecutive symbols or one or more sub-frames around the GP in the LTE-TDD frame is used for fine sensing, and the eNB 101 may configure the GP and/or other feasible sub-frames based on the requirement of the sensing mechanism corresponding to the sensed band.

In an exemplary embodiment the eNB sends the sensing configuration via the physical downlink channel in the cellular link 102c to the D2D UE being tasked to perform spectrum sensing. The sensing configuration may include sensing time, sensing interval, sensing period and sensing mechanism for use in measuring the shared band 105s, and these may be indicated to the UE implicitly or explicitly. The available resource in the shared band 105s may be included in the configuration message.

The D2D device 102 (UE) may send a sensing request to the eNB 101 via a PUCCH or by a RRC message, both communicated on a cellular link 102c. The physical resource (e.g., cyclic shift, time and frequency domain resource) for the sensing request will then in an embodiment be configured by the eNB 101 which then informs the UE 102 of those physical resources via a RRC message.

The D2D UE 102 on the primary link shall report the sensing result to eNB on the pre-defined physical resource for further decision in a needed base. eNB shall send the further sensing configuration (via downlink physical control channel or RRC message) or final decision on utilizing the shared band to D2D UE on the primary link; The sensing result may be reported as a positive/negative indication (busy or not busy) or a more detailed measurement report. The D2D UE 102 then reports the resource allocation it is to use in the shared band 105s to the eNB 101 via an RRC message or by other means in the cellular uplink channel 102c.

The eNB 101 may configure a test frame between D2D UEs for sensing in the primary band 105p or in the shared band 105s, and the sensing decision criteria may be based on a pre-defined error rate which must be satisfied at both D2D devices 102, 103 before that portion of the spectrum may be used for the shared D2D band 105s. All the involved elements/nodes 101, 102, 103 should be aware of the sensing decision (e.g. a pre-defined error rate) in advance, via control signaling. In another exemplary embodiment the D2D UEs 102, 102 could agree by themselves the configuration of the test frames as needed. The configuration of the test frame may include one or several of the following parameters: test frame signal format (such as for example coding, modulation and signal structure), test frame allocation (in time and frequency domain), and test frame power related parameters. The test frame configuration may include additional parameters also.

FIG. 7 is a signaling diagram according to an exemplary embodiment. DL control signals may be addressed to the C-RNTI assigned to the D2D cluster, which each D2D UE will be monitoring. Each of the D2D UEs 102, 103 may also monitor the UL transmissions of the other UE in the FIG. 7 embodiment so that each D2D UE can know its own sensing results as well as that of the other D2D UE without having to transmit the same information twice. This is useful for example if each D2D UE 102, 103 is tasked with sensing a different portion of the spectrum, and so the UL reporting to the eNB 101 by one UE 102, 103 is simultaneously a sharing of the sensing results across all members of the D2D cluster. Signaling for FIG. 7 is described for one UE 102 but in an embodiment both UEs 102, 103 (or at least several of all the UEs in the D2D cluster) are configured to operate as FIG. 7 describes.

At block 708, the eNB 101 notifies the D2D UE 102 on the primary D2D link 105p to perform spectrum sensing on some pre-defined band (e.g., WLAN band, TV band) via an RRC message which contains the sufficient spectrum band information. By example, RRC message 708 may be in response to detecting or anticipating some problem in the allocated/primary D2D link 105p (e.g., overloaded, bad link quality caused by interference etc).

Block 704 represents an example in which the D2D UE 102 first notices such a problem, in which case the UE 102 can send a request at message 706, such as on the PUCCH or in an RRC message, indicating the problem and preferably also requesting the proper sensing configuration of the shared band 105s. In this case the eNB 101 should configure resources periodically on which the UE 102 can send such an uplink sensing request 706 with the requested sensing configuration parameters. By example, the UE 102 can send an uplink sensing request 706 on the PUCCH periodically with the configuration it prefers the eNB 101 t set, in terms of UE specific physical resources such as spreading code, time and frequency domain resource. If instead it is the eNB 101 which first recognizes a problem or potential problem on the primary D2D link 105p as in block 702 the eNB 101 must determine on its own the parameter values for the sensing configuration.

In the message of block 708 the eNB configures the GP period according to one of the available GP configurations such as those set forth by example at FIG. 4, or if the current GP is suitable for the sensing the GP need not be specified in the message 708. The configuration within message 708 may include the length of the GP, the number of the special subframe used for the sensing (e.g., subframe #1 and/or 6 in UL-DL configuration #0), and/or the sensing interval. In the FIG. 7 example this is a short GP and so represents a coarse sensing. Also at message 708 the eNB 101 assigns the uplink resource allocation for the UE 102 to report the sensing results back to the eNB 101, and in an exemplary embodiment also the frequency bands to be sensed and the sensing mechanism the UE 102 is to use. By example, the eNB 101 may select the sensing mechanisms from among at least energy detection and feature detection; other mechanisms may be feasible for the sensed band, many of which are known in the art as noted in the background section above.

When the UE 102 on the primary link 105p receives the sensing configurations 708 from the eNB 101, the UE 102 starts its sensing procedure which could be split into coarse and fine sensing if needed, as is shown at FIG. 7. First, the UE 102 on the primary link 105p detects the available spectrum at block 710 based on the sensing mechanism (indicated via message 708 or a default mechanism if not indicated), then sends at message 712 the detection results to the eNB 101 (or to some node in the network, such as network controller or primary band controller). Meanwhile, the UE 102 prepares to use the shared band 105s.

There are two different implementations for the UE reporting procedure of message 712. In a first option the D2D UEs 102, 103 operating on the primary link 105p decides by themselves about the usage of the shared band 105s, and then one or both of them informs the eNB 101 (or whatever node is operating as the access point) about the spectrum usage by the D2D UEs 102, 103 which they've decided for the secondary/shared band 105s.

In a second option the D2D UEs 102, 103 operating on the primary link 105p sends the detection results to the eNB 101 (or other network node such as a network controller unit) for a further decision, which is the case shown at FIG. 7. In this second option the D2D UEs 102, 103 waits for the final decision from the eNB 101 (or network controller) before starting usage of any spectrum for the secondary/shared band 105s.

Specifically, the eNB 101 at block 714 decides that the coarse sensing results reported at 712 are not sufficient and sends another sensing configuration message 716 to enable fine sensing results, such as a longer GP or multiple subframes over which the UE 102 is to monitor/measure. This other configuration message 716 also identifies the UL resources which the eNB 101 has scheduled for the UE 102 to send these fine sensing results.

Like block 710, at block 722 the D2D UE 102 senses the spectrum according to the parameters it received in the other configuration message 716 and sends those fine sensing results to the eNB 101 at message 720 on the scheduled UL resources. At block 724 the eNB 101 uses those fine sensing results, with or without the coarse sensing results which were reported at message 712, to make a final decision as to what, if any, spectrum is to be used for the shared band 105s and sends an indication of that decided shared band at message 726.

Once the D2D UE 102 starts to setup on the shared band 105s and the D2D UEs 102, 103 exchange traffic there at block 728, the D2D UE 102 on the shared band keeps monitoring the shared band's resource usage situation. If the D2D UE 102 notices (e.g., by sensing result or error rate) that the corresponding frequency band in the shared link 105s is occupied, or the interference in the shared band 105s is too high, then the D2D UE 102 should prepare to deactivate the traffic transmission on the shared band.

In summary, the UE 102 operating on the primary link 105p sends the sensing related uplink signaling, detection result, and in the case the UE 102 makes the decision for the shared band 105s also the sensing decision and resource allocation to the eNB 101 via the TDD uplink control signaling channel 102c, which in an exemplary embodiment includes the uplink physical control channel and/or uplink control signaling mapped on the PDSCH in MAC-C PDU (protocol data unit) or RRC control signaling.

For the case noted above in which the UE senses to find an appropriate shared band 105s by a pre-defined test frame, two options are detailed. In a first option the eNB 101 sends the configuration of the test frames to the D2D UEs 102, 102. At least one D2D UE transmits the test frame on the shared band 105s, which the other D2D UE 103 receives. If the packet loss rate seen by the receiving D2D UE 103 is acceptable, then D2D communication can be setup on the shared band 105s under the assistance of the eNB 101. The structure of the test frame in an embodiment is predetermined between the D2D UEs 102, 103 so the receiving D2D UE 103 can precisely measure packet loss rate or interference.

In a second option for the test frame embodiments, the D2D UEs 102, 103 could agree by themselves via the D2D control link 105p about the configuration of the test frame(s) on the shared band 105s and what is the acceptable error rate (other parameters may also be used to measure channel conditions). At least one of the D2D UEs 102 then starts sending the test frame(s) on the shared band 105s, which the other D2D UE 103 receives. If the error rate is within an acceptable level, then the D2D communication could be setup on the shared band 105s by taking into account the other criteria/parameters.

In both the above test-frame options, the configuration message in an embodiment includes the following information, implicitly or explicitly: frequency band, test frame type (length, data format and structure, power setting), and period of the test frames. This test frame configuration message can be sent from the eNB 101 to the D2D UEs 102, 103 via a physical control channel or via an RRC message or from a master/cluster head UE 102 to the slaved UE(s) 103. For the implicit manner of signaling the relevant information, both the eNB 101 and the UEs 102, 103 would have a same list of the configurations stored in their local memories, and the control nodes (eNB 101 and/or cluster head UE 12) would then need to send only a configuration index to the receiving entities.

Exemplary embodiments of the invention provide certain technical effects, such as enabling the shared band 105s to be used under control of the eNB 101 with a minimum signaling burden; and for the LTE-specific examples the technical effect that the GP in the LTE-TDD frame structure can be exploited for sensing efficiently in a manner that is fully compatible with current LTE system requirements. Additionally, the traffic load and potential link quality in the primary link 105p could be eased via offload to the shared link 105s and thereby improved. There is a slight increase in the control signaling burden, specifically in reporting the results to the eNB 101, but to be fully effective these results would need to be shared amongst the D2D UEs 102, 103 anyway so this overhead burden is only marginally greater.

Figure 8:
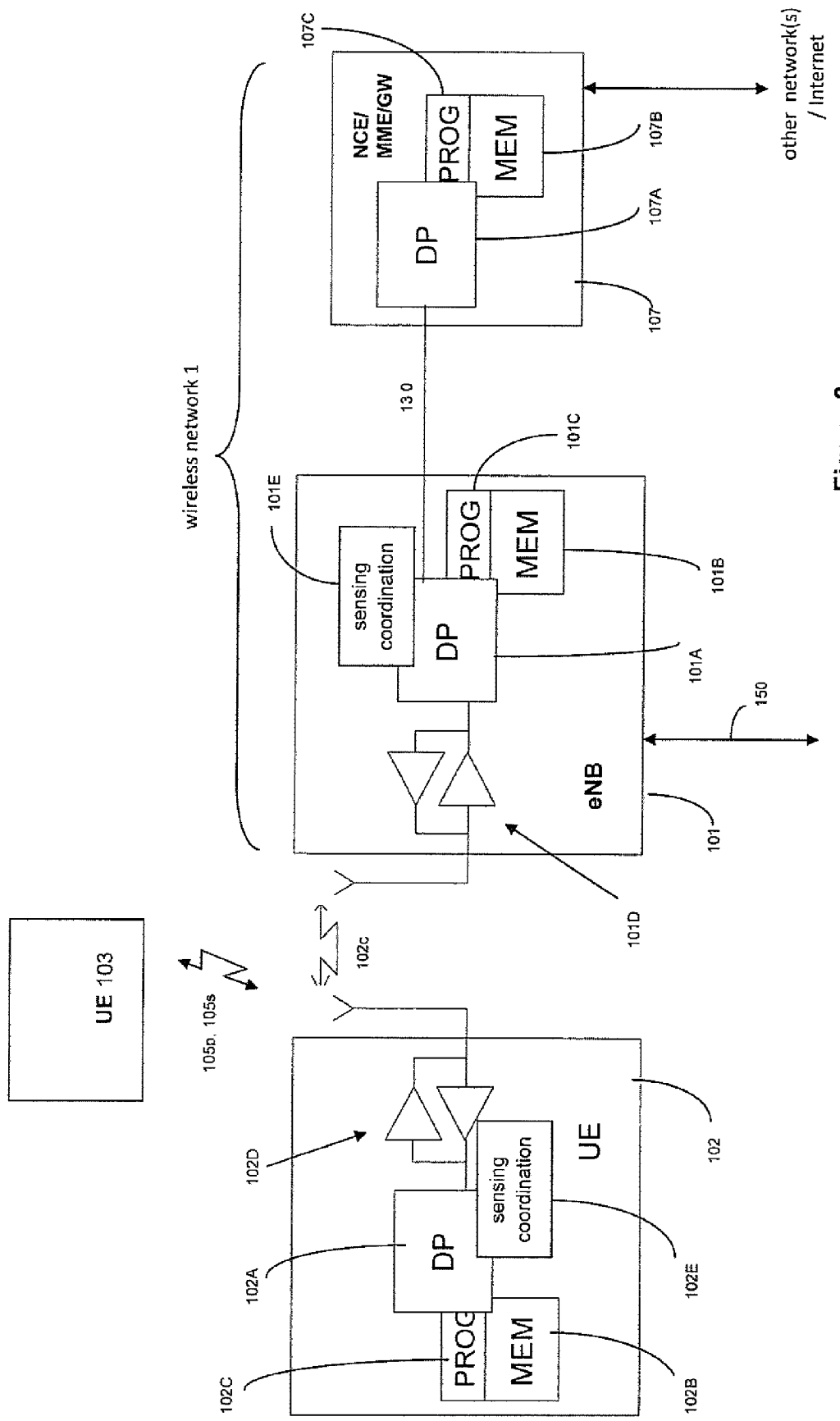
FIG. 8 shows a simplified block diagram of various electronic devices that are suitable for use in practicing the exemplary embodiments of this invention.

Before detailing the process flow diagrams of FIG. 9, now are detailed at FIG. 8 a simplified block diagram of various electronic devices and apparatus that are suitable for use in practicing the exemplary embodiments of this invention. In FIG. 8 a wireless network 1 is adapted for communication over a wireless cellular link 102c with a mobile apparatus referred to as a D2D UE 102 via a network access node such as a Node B (base station), and more specifically an eNB 101. The network 1 may include a network control element (NCE) 107 which provides connectivity with a further network such as a publicly switched telephone network and/or a data communications network (e.g., internet). The UE 102 of FIG. 8 is in the position of the local D2D device 102 shown at FIG. 1, and there are primary 105p and secondary 105s D2D links with a second UE 103 which may be constructed similar as the first UE 102.

The UE 102 includes a controller, such as a computer or a data processor (DP) 102A, a computer-readable memory medium embodied as a memory (MEM) 102B that stores a program of computer instructions (PROG) 105C, and a suitable radio frequency (RF) transmitter and receiver 102D for bidirectional wireless communications with the eNB 101 via one or more antennas. The eNB 101 also includes a controller, such as a computer or a data processor (DP) 101A, a computer-readable memory medium embodied as a memory (MEM) 101B that stores a program of computer instructions (PROG) 101C, and a suitable RF transmitter and receiver 101D for communication with the UE 102 via one or more antennas. The eNB 101 is coupled via a data/control path 130 such as an S1 interface to the NCE 107. The eNB 101 may also be coupled to another eNB via data/control path 150, which may be implemented as an X2 interface.

At least one of the PROGs 105C and 101C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 102A of the UE 102 and/or by the DP 101A of the eNB 101, or by hardware, or by a combination of software and hardware (and firmware).

For the purposes of describing the exemplary embodiments of this invention the UE 102 may be assumed to also include a sensing coordination unit 102E which operates to set spectrum sensing parameters according to those received at the receiver 102D from the eNB 101, according to the exemplary embodiments set forth above. The eNB 101 similarly has its own sensing coordination unit 105E which operates to determine values for the sensing parameters which are sent via the transmitter 101D to the UE 102 according to those exemplary embodiments.

In general, the various embodiments of the UE 102 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMS 102B and 101B may be of any type suitable to the local technical environment and may be implemented using any suitable data storage technology, such as semiconductor based memory devices, flash memory, magnetic memory devices and systems, optical memory devices and systems, fixed memory and removable memory. The DPs 102A and 101A may be of any type suitable to the local technical environment, and may include one or more of general purpose computers, special purpose computers, microprocessors, digital signal processors (DSPs) and processors based on a multicore processor architecture, as non-limiting examples.

FIG. 9 is a logic flow diagram that illustrates in accordance with various exemplary embodiments of the invention the operation of a method, and a result of execution of computer program code embodied on a computer readable memory showing procedures for various aspects of the invention. FIG. 9 illustrates at block 902 utilizing parameters in a configuration message communicated downlink between a network access node and a user equipment for setting at least a sensing time during which the user equipment performs spectrum sensing. At block 904 there is decided, from at least a result of the spectrum sensing, whether to utilize a frequency band sensed according to the parameters for direct local communications between the user equipment and at least one paired device. In various embodiments, blocks 902 and 904 may be performed by the eNB 101 or by the UE 102.

As is detailed above, in one embodiment the parameters comprise the sensing time and the frequency band and at least one of: sensing period, sensing mechanism and cyclic shift;

and in which the configuration message further allocates an uplink cellular radio resource for reporting the result of the spectrum sensing.

In another exemplary embodiment, the configuration message comprises a first configuration message and the sensing time comprises a first sensing time which is no longer than one guard period of a subframe, and the spectrum sensing comprises a first spectrum sensing. In this embodiment there is the further step of utilizing parameters in a second configuration message communicated downlink between the network access node and the user equipment for setting at least a second sensing time during which the user equipment performs further spectrum sensing. As in the examples above, for this embodiment the second configuration message follows after an uplink message from the user equipment to the access node reporting the results of the first spectrum sensing, and the second sensing time is longer than the one guard period.

In another exemplary embodiment the deciding is whether to utilize the frequency band for offload traffic from a primary band allocated by the access node for the direct local communications.

Any of the above exemplary embodiments may be performed by the network access node which sends the configuration message and which sends to the user equipment an indication of the result of the deciding at least for the case the access node approves the frequency band for the direct local communications. In one particular implementation, the spectrum sensing is performed on a test frame which is configured by the network access node.

Any of the above exemplary embodiments may also be performed by the user equipment, which performs the spectrum sensing utilizing values of the parameters in the configuration message which it receives, and which in one option decides whether to utilize the frequency band for the direct local communications in correspondence with a decision message received from the network access node or in another option decides independently of the network access node whether to utilize the frequency band for the direct local communications.

Any of the above specific examples may be embodied as a tangible computer readable memory storing computer program code that is executable by at least one processor. In these embodiments the computer program code comprises code for causing the apparatus to perform the above summarized steps, beginning at block 902 and later described. In other embodiments there is an apparatus comprising at least one processor and at least one memory storing computer program code. In these embodiments the at least one memory and the computer program code are configured, with the at least one processor, to cause the apparatus to at least perform the above described steps beginning at block 902 and discussed thereafter, of which any after-discussed steps are optional.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 7 and/or 9 may be viewed as method steps, and/or as operations that result from operation of computer program code, and/or as a plurality of coupled logic circuit elements constructed to carry out the associated function(s). At least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

What is claimed is:

1. A method, comprising:
utilizing parameters in a configuration message communicated downlink between a network access node and a user equipment for setting at least a sensing time during which the user equipment performs spectrum sensing; and
deciding from at least a result of the spectrum sensing whether to utilize a frequency band sensed according to the parameters for direct local communications between the user equipment and at least one paired device,
in which the method is executed by the network access node which sends the configuration message and which sends to the user equipment an indication of the result of the deciding at least for the case the access node approves the frequency band for the direct local communications.

2. The method according to claim 1, in which the parameters comprise the sensing time and the frequency band and at least one of: sensing period, sensing mechanism and cyclic shift;
in which the configuration message further allocates an uplink cellular radio resource for reporting the result of the spectrum sensing.

3. The method according to claim 1, in which the sensing time is no longer than one guard period of a subframe.

4. The method according to claim 3, in which the configuration message comprises a first configuration message and the sensing time comprises a first sensing time and the spectrum sensing comprises a first spectrum sensing, the method further comprising:

utilizing parameters in a second configuration message communicated downlink between the network access node and the user equipment for setting at least a second sensing time during which the user equipment performs further spectrum sensing, wherein the second configuration message follows an uplink message from the user equipment to the access node reporting the results of the first spectrum sensing, and the second sensing time is longer than the one guard period.

5. The method according to claim 1, in which the deciding is whether to utilize the frequency band for offload traffic from a primary band allocated by the access node for the direct local communications.

6. The method according to claim 1, in which the spectrum sensing is performed on a test frame configured by the network access node.

7. The method according to claim 1, in which setting the sensing time comprises the network access node selecting a subframe configuration from a pre-determined set of subframe configurations, wherein different subframe configurations of the predetermined set have different lengths for a guard period.

8. A method, comprising:

utilizing parameters in a configuration message communicated downlink between a network access node and a user equipment for setting at least a sensing time during which the user equipment performs spectrum sensing; and deciding from at least a result of the spectrum sensing whether to utilize a frequency band sensed according to the parameters for direct local communications between the user equipment and at least one paired device, in which the method is executed by the user equipment which performs the spectrum sensing utilizing values of the parameters in the configuration message which it receives, and which decides whether to utilize the frequency band for the direct local communications in correspondence with a decision message received from the network access node.

9. An apparatus, comprising:
at least one processor; and
at least one memory storing computer program code;
the at least one memory and the computer program code configured, with the at least one processor, to cause the apparatus to at least:
utilize parameters in a configuration message communicated downlink between a network access node and a user equipment for setting at least a sensing time during which the user equipment performs spectrum sensing; and
decide from at least a result of the spectrum sensing whether to utilize a frequency band sensed according to the parameters for direct local communications between the user equipment and at least one paired device,
in which the apparatus comprises the network access node which is configured to send the configuration message and to send to the user equipment an indication of the result of the deciding at least for the case the access node approves the frequency band for the direct local communications.

10. The apparatus according to claim 9, in which the parameters comprise the sensing time and the frequency band and at least one of: sensing period, sensing mechanism and cyclic shift;
in which the configuration message further allocates an uplink cellular radio resource for reporting the result of the spectrum sensing.

11. The apparatus according to claim 9, in which the sensing time is no longer than one guard period of a subframe.

12. The apparatus according to claim 11, in which the configuration message comprises a first configuration message and the sensing time comprises a first sensing time and the spectrum sensing comprises a first spectrum sensing;
in which the at least one memory and the computer program code are configured with the at least one processor to cause the apparatus further to at least:
utilize parameters in a second configuration message communicated downlink between the network access node and the user equipment for setting at least a second sensing time during which the user equipment performs further spectrum sensing,
wherein the second configuration message follows an uplink message from the user equipment to the access node reporting the results of the first spectrum sensing, and the second sensing time is longer than the one guard period.

13. The apparatus according to claim 9, in which the decision is whether to utilize the frequency band for offload traffic from a primary band allocated by the access node for the direct local communications.

14. The apparatus according to claim 9, in which the spectrum sensing is performed on a test frame configured by the network access node.

15. The apparatus according to claim 9, wherein the at least one memory stores a pre-determined set of subframe configurations of which different subframe configurations of the predetermined set have different lengths for a guard period,
and in which the at least one memory and the computer program code are configured with the at least one processor to cause the apparatus further to at least set the sensing time by selecting a subframe configuration from the pre-determined set of subframe configurations.

16. An apparatus, comprising:
at least one processor; and
at least one memory storing computer program code;
the at least one memory and the computer program code configured, with the at least one processor, to cause the apparatus to at least:
utilize parameters in a configuration message communicated downlink between a network access node and a user equipment for setting at least a sensing time during which the user equipment performs spectrum sensing; and
decide from at least a result of the spectrum sensing whether to utilize a frequency band sensed according to the parameters for direct local communications between the user equipment and at least one paired device,
in which the apparatus comprises the user equipment which is configured to perform the spectrum sensing utilizing values of the parameters in the configuration message which the user equipment receives, and which is configured to decide whether to utilize the frequency band for the direct local communications in correspondence with a decision message received from the network access node.

* * * * *